April 6, 1926.

W. P. KEITH

PNEUMATIC TIRE

Filed Nov. 13, 1922

Inventor
Walter P. Keith
By
Rogers, Kennedy & Campbell Att'ys

April 6, 1926.  
W. P. KEITH  
PNEUMATIC TIRE  
Filed Nov. 13, 1922
1,579,817
2 Sheets-Sheet 2
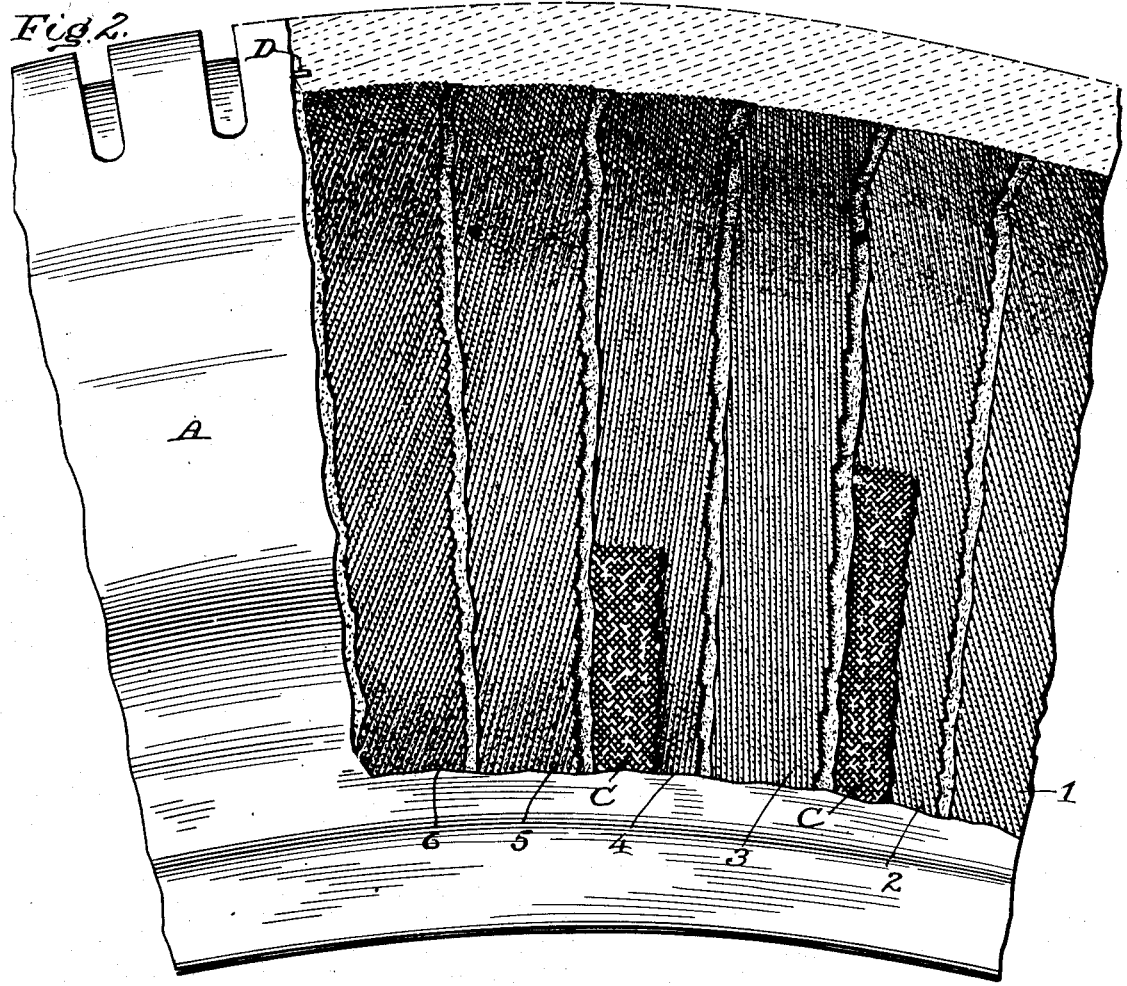
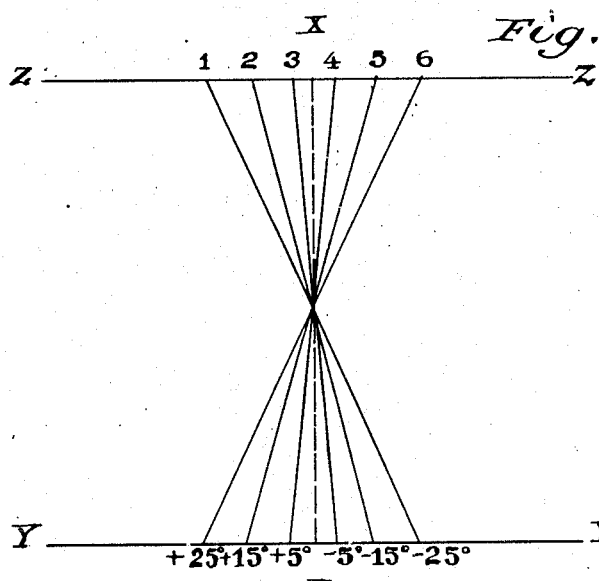
Inventor  
Walter P. Keith  
by  
Rogers, Kennedy & Campbell Att'ys Patented Apr. 6, 1926.

1,579,817

UNITED STATES PATENT OFFICE.

WALTER P. KEITH, OF NEW CASTLE, PENNSYLVANIA, ASSIGNOR TO SEIBERLING RUBBER COMPANY, A CORPORATION OF DELAWARE.

PNEUMATIC TIRE.

Application filed November 13, 1922. Serial No. 600,555.

*To all whom it may concern:*

Be it known that I, WALTER P. KEITH, a citizen of the United States, residing at New Castle, in the county of Lawrence and State of Pennsylvania, have invented certain new and useful Improvements in Pneumatic Tires, of which the following is a specification, reference being had therein to the accompanying drawing.

This application relates to pneumatic tires or tire casings, and more particularly to those of the so-called "cord" type. In the commercial tires of this kind, the carcass is made up of a plurality of superimposed layers or plies of cords arranged diagonally across the tire at an angle of approximately 45°, the cords in the alternate layers being parallel to each other and extending in one direction, and those in the intermediate layers being parallel to each other and extending in the reverse direction, so that the cords in the adjacent layers necessarily cross each other at an angle of about 90°. As the tires are thus constructed, the cords in the adjacent layers move relatively to each other and set up a shearing action which first breaks down the rubber insulation between the cords and then brings about the rupture of the cords themselves, due to the constant abrading action which necessarily takes place.

The present invention is intended to counteract the objectionable shearing action above referred to, and to this end, the cords are arranged at varying angles in the successive layers in such manner that the cords in the adjacent layers will cross each other at a comparatively small angle, thereby reducing the relative movement of said cords to a minimum without sacrificing the advantages derived from the general crossing of the cords in the several layers. In the embodiment illustrated, the carcass is made up of six layers of cords, those of the first three layers (which may be regarded as constituting one group) extending across the tire in the same general direction but arranged at progressively different angles so as to cross each other at an angle of about 10°, and the cords of the last three layers (which may be regarded as constituting another group) extending across the tire in the reverse direction but arranged at progressively different angles so as also to cross each other at an angle of about 10°. In this instance, the cords of the innermost and outermost layers, although extending across the tire in reverse directions, are arranged at an angle of approximately 25° to an axial plane of the tire, the cords of the intermediate layers being arranged at gradually decreasing angles within the respective groups to approximate that plane. Actual practice has demonstrated that a tire built in the foregoing manner not only has a longer life than the ordinary commercial tire, but is stronger and more durable in every respect, besides possessing greater resiliency and easier riding qualities, without any tendency to side-sway.

Referring to the drawings:

Fig. 2 is an enlarged fragmentary side view, showing the disposition of the cords in the various layers; and Fig. 3 is a diagram.

Figure 1:
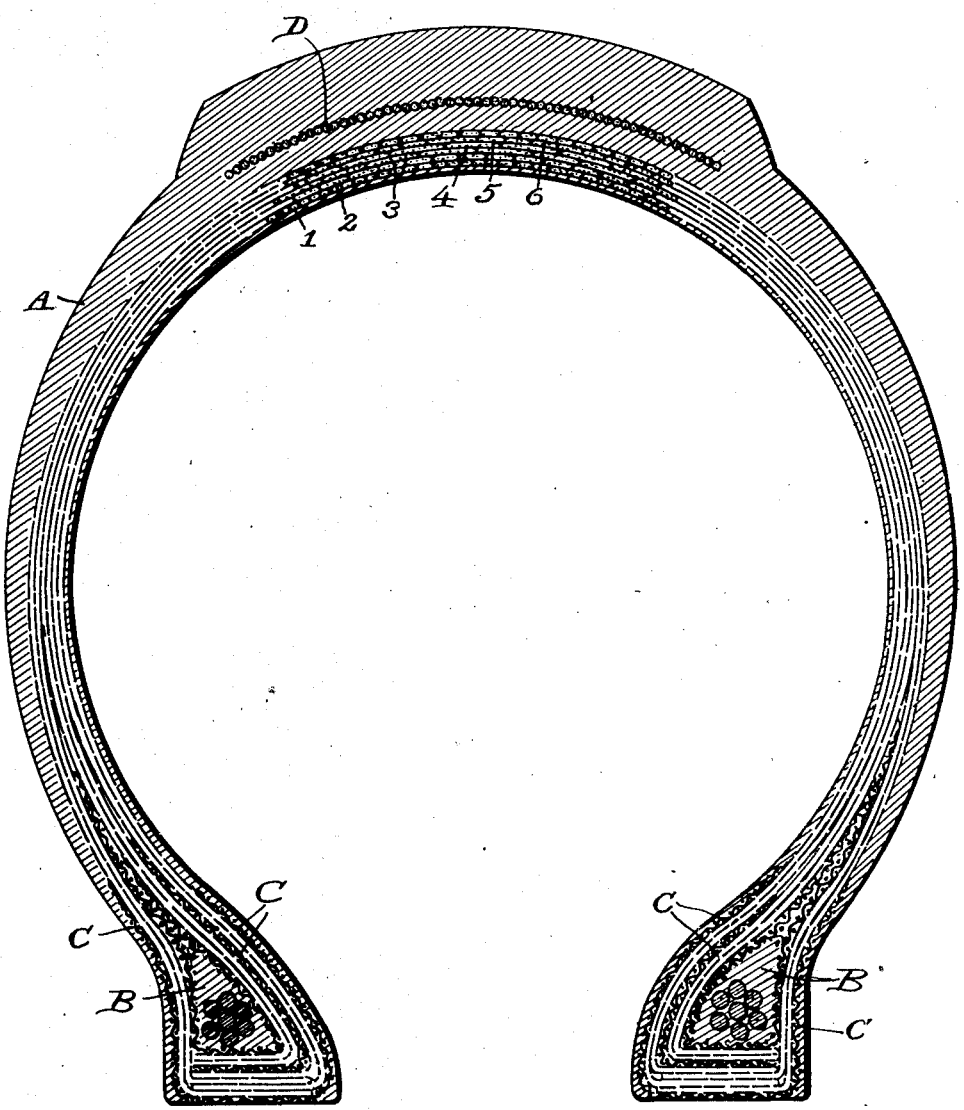
Fig. 1 is an enlarged transverse section of the improved tire.

The improved tire comprises, as customary, in addition to the carcass, the rubber body portion A, the beads or bead rings B, the fabric chafing strips C, and the circumferential band or breaker strip D, which parts may be of any approved style or form. In the present embodiment, which is illustrated merely by way of example, the carcass comprises six distinct layers of cords, designated 1, 2, 3, 4, 5 and 6, respectively, anchored at opposite sides to the beads B and separated from each other by the rubber of the body portion A, all in the usual way. In accordance with the present invention, the cords are arranged at varying angles in the successive layers, those of the first three layers (constituting one group) extending across the tire in one direction, and those of the last three layers (constituting a second group) extending across the tire in the reverse direction. It will be noted, however, that the cords in each group, while extending across the tire in the same general direction, are actually arranged at different angles in the different layers. As a result, the cords of each two adjacent layers cross each other at a relatively small angle, which preferably, although not necessarily, is uniform throughout the several layers.

The angles of the cords are laid out in the diagram of Fig. 3, which shows one cord from each layer, the cords selected being those which cross each other at a common point. At this juncture, it may be well to state that the angles hereinafter mentioned are to be understood as measured with reference to an axial plane of the tire, that is to say, a plane containing the axis about which the tire rotates. This plane is represented in the diagram by the dotted line X—X, the full lines Y—Y and Z—Z being representative of the beads to which the cords are anchored. As will be seen, No. 1 cord (taken from the layer 1) is arranged at an angle of —25°, No. 2 cord at —15°, No. 3 cord at —5°, No. 4 cord at +5°, No. 5 cord at +15°, and No. 6 cord at +25°, thus giving an angle of 10° between each pair of adjacent cords, and a total angle of 50° between the first and last cords. In the commercial tires, it will be remembered, the cords of each two adjacent layers cross each other at an angle of 90°, due to the fact that the cords in the alternate layers extend across the tire in opposite directions and at an angle of 45° to an axial plane of the tire.

It will be seen, therefore, that in the present arrangement, the angle of crossing of the cords in adjacent layers is greatly reduced as compared to that prevailing in the old arrangement, this reduction of angle resulting not only in a corresponding reduction of the relative movement between the adjacent cords, but also in a corresponding reduction in the duration of such relative movement as referred to the revolution of the tire. In other words, the cords in the adjacent layers, while actually crossing each other, so nearly approximate a common angle that they are subjected to substantially the same influences when the tire is flexed under load. At the same time, the arrangement of the cords at varying angles throughout the successive layers enables the cords of the non-adjacent layers to cross each other at an angle great enough to render the tire thoroughly stable and well balanced.

The particular angles above specified are merely given by way of example and as suitable for a tire made up of six layers of cords, and it should be understood that they may be varied considerably without departing from the spirit of this invention. Such angles, though variable even for a given tire, will depend to a large extent upon the number of layers comprised within the tire carcass. Thus, assuming an angle of 25° for the cords of the first and last layers, the angle of crossing of the cords in the adjacent layers, if uniform, would naturally become less and less as the number of layers increased. On the other hand, if it were desired to keep the angle of crossing uniform as between tires differing in the number of layers, this might be done by increasing or diminishing the angle of the cords of the first and last layers accordingly. However, in any case, the angle of crossing of the cords in adjacent layers shoud be materially less than that of the cords which cross the axial plane of the tire at the greatest angle (such cords herein being those of the first and last layers), as otherwise the angle of crossing cannot be reduced to the required extent.

The invention is not of course confined to the precise construction shown and described, nor to any other mode of construction by which the same may be carried into effect, as many changes may be made in arrangement and grouping of the cords without departing from the principle of the invention and without sacrificing its chief advantages. It should be understood, therefore, that the invention is not limited to any specific form or embodiment except in so far as such limitations are set forth in the claims.

The improved tire may be constructed according to any of the well known methods, and no detailed description therefore seems necessary. Ordinarily, the cord layers are applied in the form of strips, each having the cords arranged parallel to each other and held together by the rubber in which they are embedded, or by very fine cross-threads having no load-carrying capacity. This practise may be followed in carrying out the present invention, although it is obvious that the cords should be arranged at different angles in the different strips in order to cross each other in the manner before noted. It should be understood, however, that there are various other ways in which the cords might be applied, if desired. For example, according to another well known method, the cord layers could be constituted by passing one or more lengths of cords back and forth from bead to bead, and then adding rubber sheets separately. The method employed is entirely immaterial so long as the completed tire carcass is made up in the manner before described.

In the appended claims and throughout the foregoing specification, the word "cords" has been used in its broadest sense and is intended to include cotton cords, wire cords, or any other cordlike elements capable of bearing loads and strains.

Having thus described my invention, what I claim is as follows:

1. A pneumatic tire embodying a carcass made up of a group of superimposed layers of cords crossing the tire in the same general direction on one side of an axial plane of the tire, the cords of the successive layers crossing at increasing angles to said plane, and another group of superimposed layers of cords crossing the tire on the other side of said axial plane in the same general direction but reverse to that of said first group, the cords of the successive layers of said second group also crossing at increasing angles to said axial plane.

2. A pneumatic tire embodying a carcass made up of a plurality of superimposed layers of cords comprising innermost, outermost, and a plurality of intermediate layers, the cords of the innermost and outermost layers crossing the tire at the same acute angle to an axial plane thereof but extending in reverse directions, and those of the intermediate layers crossing the tire at angles of lesser degree and varying in adjacent layers.

3. A pneumatic tire embodying a carcass made up of a plurality of superimposed layers of cords comprising innermost, outermost, and a plurality of intermediate layers, the cords of the innermost and outermost layers crossing the tire in reverse directions, and those of the intermediate layers crossing the tire at angles which, as measured with reference to an axial plane of the tire, gradually decrease from said innermost and outermost layers, whereby the cords in any two adjacent layers cross each other at an angle less than that at which the cords of the innermost and outermost layers extend across the tire.

4. A pneumatic tire embodying a carcass made up of a plurality of superimposed layers of cords, the said cords being arranged across the tire at varying angles in successive layers, and the cords in each two adjacent layers crossing each other at an angle less than the greatest angle at which the cords cross the tire.

5. A pneumatic tire embodying a carcass made up of a plurality of superimposed layers of cords, the said cords being arranged across the tire at varying angles in successive layers, and the cords in each two adjacent layers crossing each other at substantially the same angle, this latter angle being less than the greatest angle at which the cords cross the tire.

6. A pneumatic tire embodying a carcass made up of a plurality of superimposed layers of cords, the said layers being arranged across the tire in groups, the cords of adjacent groups being reversely disposed and the cords of the layers crossing the tire at such angles to an axial plane of the tire that the cords in each two adjacent layers cross each other at substantially the same angle.

7. A pneumatic tire embodying a carcass made up of a plurality of superimposed layers of cords, the cords of said layers being arranged in reversely disposed groups, and the cords in the successive layers of each group crossing the tire at different angles, the said angles being such that the cords in each layer cross the cords of each next adjacent layer at a substantially uniform angle throughout the various layers.

In testimony whereof, I have affixed my signature hereto.

WALTER P. KEITH.